United States Patent
Gracyalny et al.

(10) Patent No.: US 12,479,486 B2
(45) Date of Patent: Nov. 25, 2025

(54) CART WITH A FOLDABLE PLATFORM

(71) Applicant: Expert Engineering Solutions, Saukeville, WI (US)

(72) Inventors: Gary J. Gracyalny, Saukville, WI (US); Daniel S. Kelly, Saukville, WI (US); Brady J. Puetz, Saukville, WI (US); Kimberly J. Coticchia, Saukville, WI (US)

(73) Assignee: EXPERT ENGINEERING SOLUTIONS, Saukeville, WI (US)

( * ) Notice: Subject to any disclaimer, the term of this patent is extended or adjusted under 35 U.S.C. 154(b) by 432 days.

(21) Appl. No.: 18/335,551

(22) Filed: Jun. 15, 2023

(65) Prior Publication Data
US 2023/0406383 A1 Dec. 21, 2023

Related U.S. Application Data

(60) Provisional application No. 63/353,134, filed on Jun. 17, 2022.

(51) Int. Cl.
*B62B 3/02* (2006.01)
*B62B 3/04* (2006.01)

(52) U.S. Cl.
CPC ............. *B62B 3/02* (2013.01); *B62B 3/04* (2013.01); *B62B 2203/00* (2013.01); *B62B 2205/02* (2013.01); *B62B 2301/04* (2013.01)

(58) Field of Classification Search
CPC ......... B62B 3/02; B62B 3/04; B62B 2203/00; B62B 2205/02; B62B 2301/04
See application file for complete search history.

(56) References Cited

U.S. PATENT DOCUMENTS

| 4,346,906 A | * | 8/1982 | Thorpe | B62B 3/186 280/33.996 |
| 8,070,181 B2 | * | 12/2011 | Forrest | B62B 3/02 280/42 |
| 2010/0219615 A1 | * | 9/2010 | Forrest | B62B 3/02 280/638 |

* cited by examiner

*Primary Examiner* — Bryan A Evans
(74) *Attorney, Agent, or Firm* — Peigen Jiang; Greenberg Traurig, LLP

(57) ABSTRACT

A cart includes a fixed platform having a first edge and a first top surface for carrying cargos, a foldable platform having a second top surface for carrying cargos and a second edge pivotally attached to the first edge, the foldable platform pivoting between a horizontal position and an upright position, the first and second top surface being in the same plane when the foldable platform being at the horizontal position, a support structure extended from the fixed platform to beneath the foldable platform, and a support rod pivotally attached to a bottom surface of the foldable platform and pivoting between a first and second angle to the foldable platform, the second angle being different from the first angle, when at the second angle, the support rod, the support structure, the fixed platform and the foldable platform forming a triangle holding the foldable platform at the upright position.

20 Claims, 4 Drawing Sheets

CART WITH A FOLDABLE PLATFORM

BACKGROUND

The present disclosure relates generally to small transport equipment, and, more particularly, to a cart with a foldable platform.

Small transport equipment, which is normally operated manually, is widely used in warehouses and factory floors for transporting cargos around. Platform cart is one of such transport equipment. A platform cart has a large, low-lying platform for carrying bulky items. However, a large platform takes up sizable storage space, thus limits the availability of such platform cart.

As such what is desired is a platform cart that provides a large platform when used and takes up small space when stored.

Figure 1A:
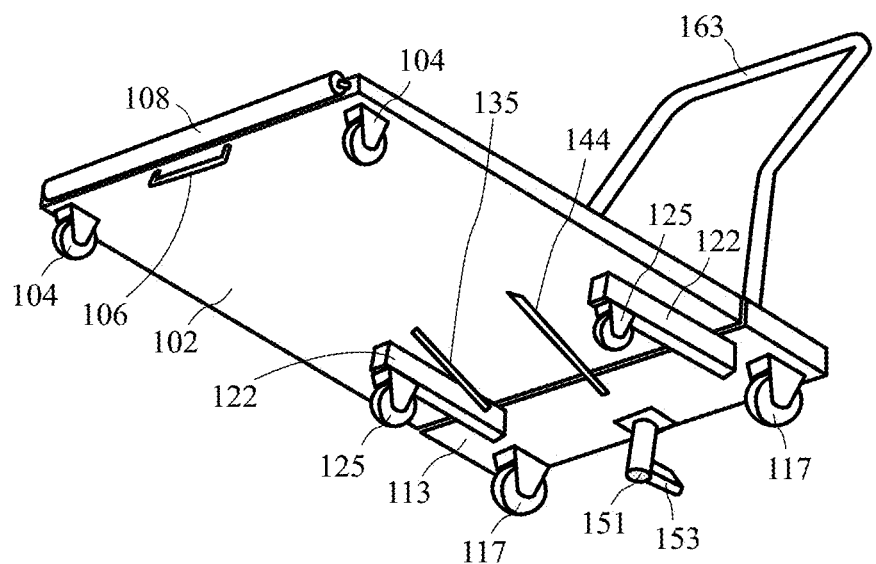
FIGS. 1A and 1B are perspective views of a cart with a foldable platform in accordance with an embodiment of the present disclosure.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to a cart with a foldable platform. Preferred embodiments of the present disclosure will be described hereinafter with reference to the attached drawings.

Figure 1B:
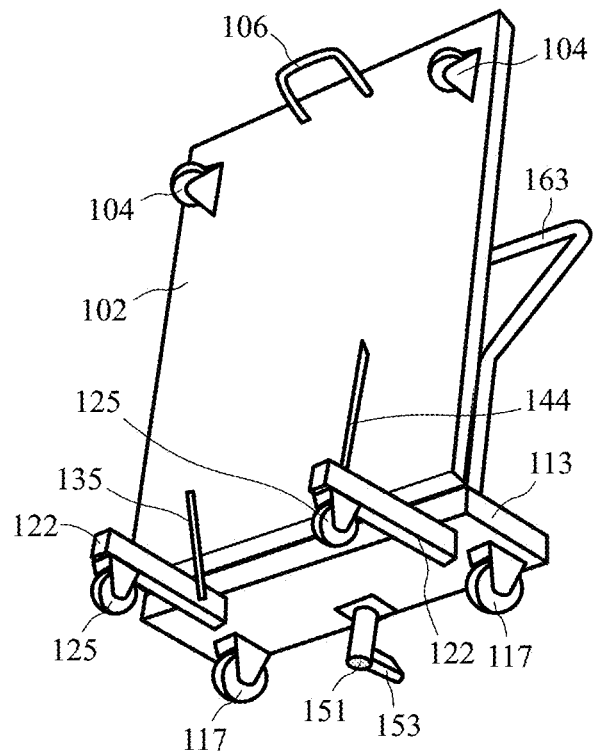

FIGS. 1A and 1B are perspective views of the cart with a foldable platform in accordance with an embodiment of the present disclosure.

Referring to FIG. 1A, the cart of the present disclosure includes a fixed platform 113 and a foldable platform 102 pivotally connected to the fixed platform 113. Two exemplary support beams 122 are mounted to the fixed platform 113 and extended to underneath the foldable platform 102 to provide support to the foldable platform 102 in a horizontal position. Exemplary caster wheels 104, 117 and 125 are mounted to the foldable platform 102, the fixed platform 117 and the support beams 122 to provide mobility to the cart.

The cart is also equipped with a floor lock 151 to provide friction and an extended reach on the floor when stationery and stability of the cart is desired. The floor lock 151 exemplarily includes a footer 153 that can be move between a higher position and a lower position. At the higher position, the footer 153 is away from the floor. At the lower position, the footer 153 touches the floor to provide the friction and the extended reach on the floor.

Referring again to FIG. 1A, a lifting handle 106 is mounted at a far end of the foldable platform to facilitate a lifting of the far end of the foldable platform 102. An exemplary roller 108 is also mounted at the far end of the foldable platform 102 to make sliding a cargo onto the cart easier. A cart handle 163 is removably attached to the fixed platform 113 near an end opposite to the far end of the foldable platform for pushing or pulling the cart.

Referring again the FIG. 1A, an exemplary strut 135 is mounted between the fixed platform 113 and the foldable platform 102 to make pivoting the foldable platform 102 either upward or downward easier. In an embodiment, the cart of the present disclosure is equipped with a support rod 144 attached to the foldable platform 102. The support rod 144 serves to keep the foldable platform 102 in an upright position as shown in FIG. 2B.

As shown in FIG. 1B, when the foldable platform 102 pivots to the upright position, a footprint of cart of the present disclosure is much reduced to that of the fixed platform plus the area occupied by the support beams 122.

Figure 2:
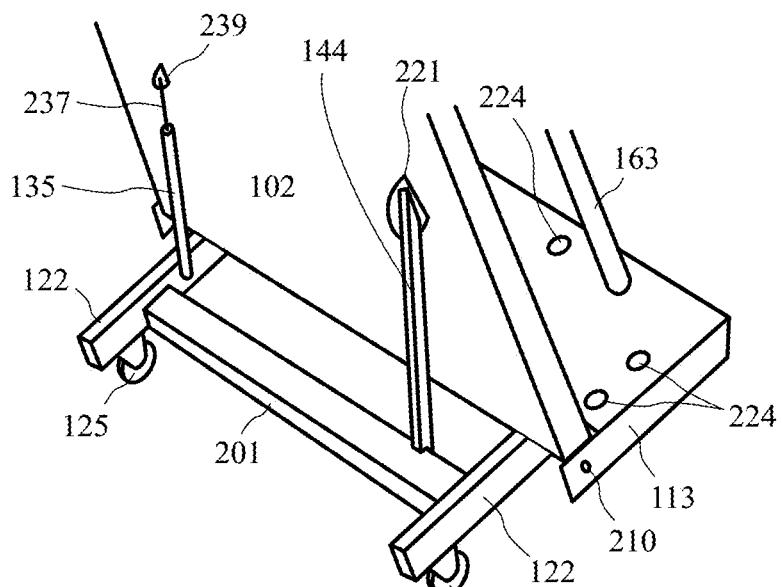
FIG. 2 is a perspective view of a part of the cart illustrating a holding mechanism of the foldable platform in accordance with an embodiment of the present disclosure.

FIG. 2 is a perspective view of a part of the cart illustrating a holding mechanism of the foldable platform 102 in accordance with an embodiment of the present disclosure. The support rod 144 is pivotally attached, at a first end, to a first mounting fixture 221 protruding from a bottom of the foldable platform 102. A second end of the support rod 144, opposite to the first end, leans against an exemplary crossbar 201 mounted between the two support beams 122. As the crossbar 201 is a rigid member of the fixed platform 113, the support rod 144, a part of the foldable platform, a part of the support beam 122 and a part of the fixed platform 113 form a triangle when viewed from the side, which prevents the foldable platform 102 from falling back down.

As shown in FIG. 2, the strut 135 is pivotally attached between the support beam 122 and a second mounting fixture 239 protruding from the bottom of the foldable platform 102. In an embodiment, the strut 135 has a gas cylinder and a cylindrical rod 237 slidable along the gas cylinder which provide resistance to the slide of the rod 237. In an embodiment, a releasable locking mechanism (not shown) is provided to the cylindrical rod 237 and the gas cylinder, so that when the foldable platform 102 is at the upright position as shown in FIG. 2, the cylindrical rod 237 is extended and locked in position to prevent foldable platform 102 from falling back down. The cylindrical rod 237 can be released from the locked position to allow the foldable platform 102 to fall back down. In this embodiment, the support rod 144 becomes optional.

Referring again to FIG. 2, the foldable platform 102 is pivotal around a shaft 210 mounted to brackets extended from the fixed platform 113. In addition, the fixed platform 113 has a plurality of holes 224 for holding guides as further described hereinbelow.

Figure 3A:
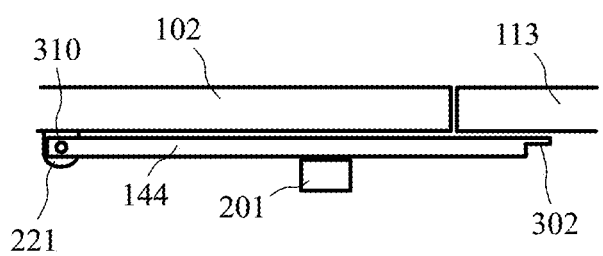
FIGS. 3A and 3B illustrate details of the holding mechanism of the foldable platform in accordance with an embodiment of the present disclosure.
Figure 3B:
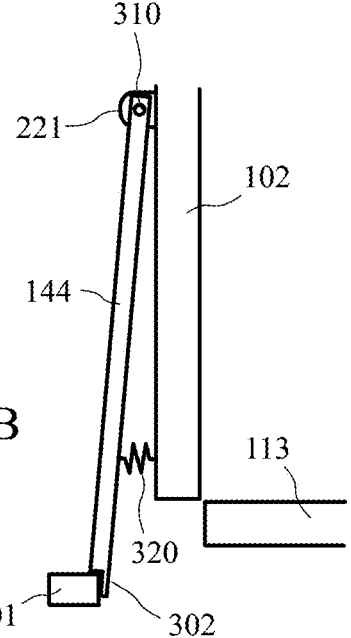

FIGS. 3A and 3B illustrate details of the holding mechanism of the foldable platform 102 in accordance with an embodiment of the present disclosure.

Referring to FIG. 3A, when the foldable platform 102 is at the horizontal position, the support rod 144 rests on the crossbar 201. The first end of the support rod 144 is pivotally attached to a pin 310 which is mounted to the second mounting fixture 221. The second end of the support rod 144 has a L-shaped structure which is free from any engagement in this horizontal position. As shown in FIG. 3A, the support rod 144 is almost parallel to the foldable platform 102, i.e., at a zero angle to the foldable platform 102.

Referring to FIG. 3B, when the foldable platform 102 is at the upright position, the first end of the support rod 144 swings upward allowing the second end of the support rod 144 to engage the crossbar 201. As shown in FIG. 3B, each leg of the L of the L-shaped structure 302 is forced against a side of the crossbar 201 to allow the second end to securely engage the crossbar 201. In an embodiment, the L-shaped structure 302 can be placed on the crossbar 201 by an operator for the engagement. In another embodiment, a spring 320 is placed between the support rod 144 and the bottom of the foldable platform 102 to urge the support rod 144 away from the foldable platform 102 against the crossbar 201. In yet another example, a torsion spring is mounted around the pin 310 to urge the support rod 144 away from the foldable platform 102. A length of the support rod 144 is so designed, when the foldable platform 102 swings to the upright position, e.g., 90 degrees to the fixed platform 113, the L-shaped structure 302 engages the crossbar 201 to prevent the foldable platform 102 to fall back down. At this position, the support rod 144 is at an acute angle to the foldable platform 102.

To allow the foldable platform 102 to fall back down, a push to the right can disengage the support rod 144 from the crossbar 201.

In an embodiment, the foldable platform 102 is dead stopped from pivoting past 90 degrees toward the fixed platform 113. In another embodiment, the foldable platform 102 can pivot 180 degrees to lay flat on top of the fixed platform 113.

Figure 4A:
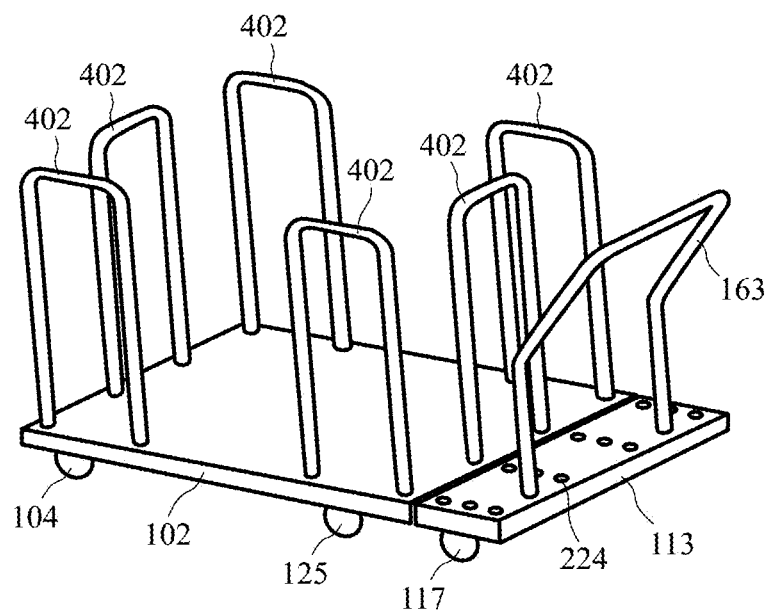
FIGS. 4A and 4B are perspective views of the cart with reconfigurable guides in accordance with an embodiment of the present disclosure.
Figure 4B:
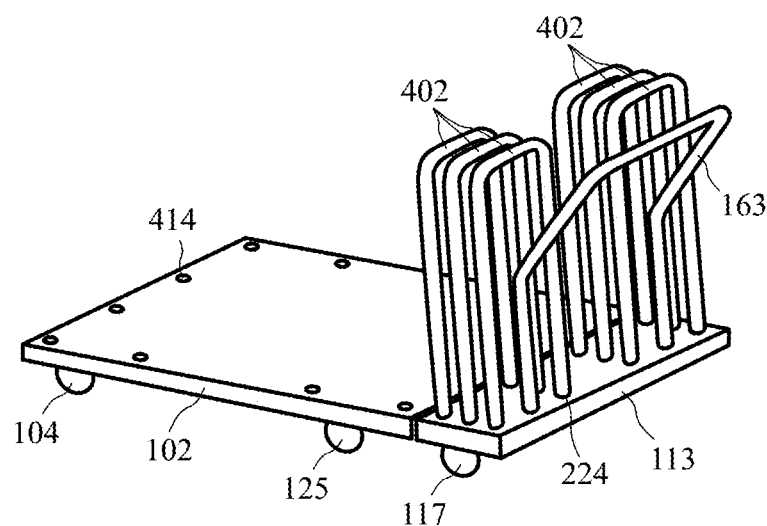

FIGS. 4A and 4B are perspective views of the cart with reconfigurable guides in accordance with an embodiment of the present disclosure.

Referring to FIG. 4A, a plurality of guides 402 are exemplarily attached to a periphery of the foldable platform 102 to guide against carried cargos from falling off the foldable platform 102. The plurality of holes 224 on the fixed platform 113 can be used to store the plurality of guides 402 as shown in FIG. 4B.

Referring to FIG. 4B, a plurality of holes 414 on the foldable platform 102 can be strategically placed so that the guides can be reconfigured to fit specific guiding needs.

Figure 5:
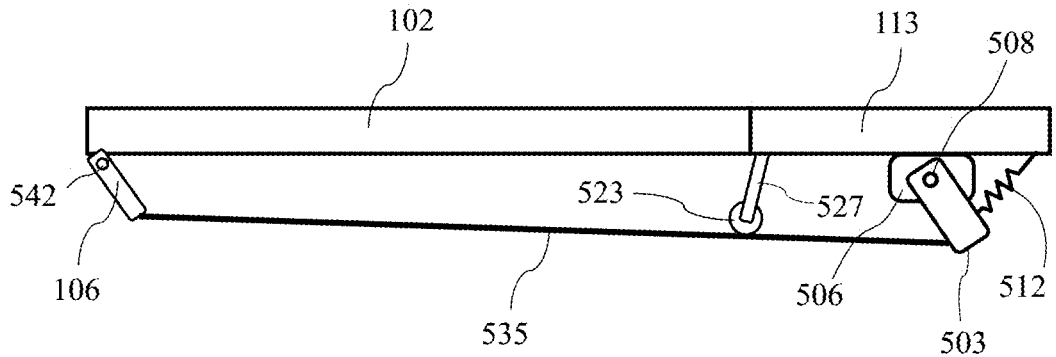
FIG. 5 illustrates a floor lock mechanism in accordance with an embodiment of the present disclosure.

FIG. 5 illustrates a floor locking mechanism in accordance with an embodiment of the present disclosure. A floor stand 503 is pivotally mounted to a mounting fixture 506 on the bottom of the fixed platform 113. When the floor stand 503 is in a vertical position, a bottom of the floor stand 503 touches the floor to provide friction against movements by the fixed platform 113. When the floor stand 503 is in an angled position, the floor stand 503 does not touch the floor to allow the fixed platform 113 to move freely. In an embodiment, the floor stand 503 has a range of motion between the vertical position and the angled position as shown in FIG. 5.

Referring again to FIG. 5, a spring 512 connected between the fixed platform 113 and the floor stand 503 urges the floor stand 503 toward an angled position. A cable 535 is also attached to the floor stand 503 for pulling the floor stand 503 toward the vertical position. Another end of the cable 535 is attached to the lifting handle 106 which is pivotally attached to a pin 542 mounted on the foldable platform 102. When an operator lifts the foldable platform 102 by pulling the lifting handle 106, a swing motion of the lifting handle 106 will pull the floor stand 503 to the vertical position before the foldable platform 102 being further lifted to the upright position. A pulley 523 attached to a fixture 527 mounted to the fixed platform 113 keeps the cable pulled smoothly and in place when the foldable platform 102 pivots to the upright position. In embodiments, the cable 535 is a non-elastic steel cable.

Figure 6:
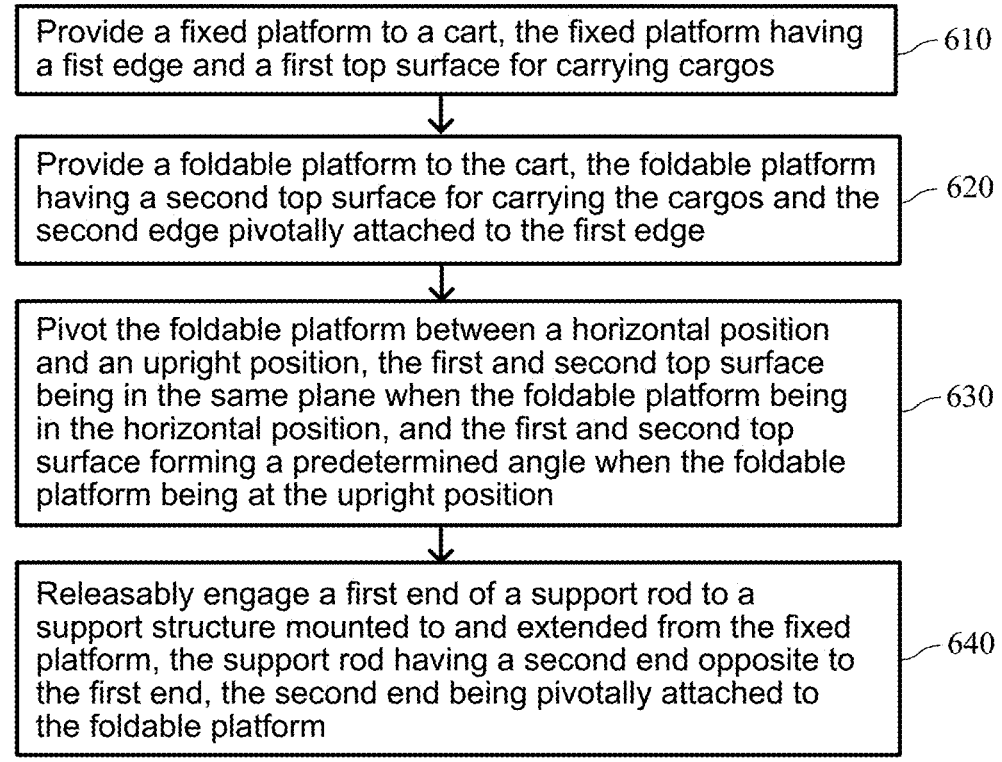
FIG. 6 is a flowchart illustrating an operation of the platform cart in accordance with an embodiment of the present disclosure.

FIG. 6 is a flowchart illustrating an operation of the platform cart in accordance with an embodiment of the present disclosure. The operation begins with providing a fixed platform to the cart, the fixed platform having a first edge and a first top surface for carrying the cargos in block 610. In block 620, the operation includes providing a foldable platform to the cart, the foldable platform having a second top surface for carrying the cargos and a second edge pivotally attached to the first edge. In block 630, the operation includes pivoting the foldable platform between a horizontal position and an upright position, the first and second top surface being in the same plane when the foldable platform being at the horizontal position, and the first and second top surface forming a predetermined angle when the foldable platform being at the upright position. In block 640, the operation includes releasably engaging a first end of a support rod to a support structure mounted to and extended from the fixed platform, the support rod having a second end opposite to the first end, the second end being pivotally attached to the foldable platform.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and, in a manner, consistent with the scope of the disclosure, as set forth in the following claims.

What is claimed is:

1. An apparatus for transporting cargos, the apparatus comprising:
    a fixed platform having a first edge and a first top surface for carrying the cargos;
    a foldable platform having a second top surface for carrying the cargos and a second edge pivotally attached to the first edge, the foldable platform pivoting between a horizontal position and an upright position, the first and second top surface being in a same plane when the foldable platform being at the horizontal position, and the first and second top surface forming a predetermined angle when the foldable platform being at the upright position;
    a support structure extended from the fixed platform to beneath the foldable platform; and
    a support rod pivotally attached to a bottom surface of the foldable platform and pivoting between a first and second angle to the foldable platform, the second angle being different from the first angle, when at the second angle, the support rod, a part of the support structure, a part of the fixed platform and a part of the foldable platform forming a triangle holding the foldable platform at the upright position.

2. The apparatus of claim 1 further comprising a lifting handle attached near a third edge of the foldable platform, the third edge being opposite to the second edge.

3. The apparatus of claim 2 further comprising a roller mounted next to the third edge providing a rolling support for the cargos.

4. The apparatus of claim 2 further comprising:
a first caster wheel attached to a bottom surface of the foldable platform in a vicinity of the third edge;
a second caster wheel attached to the support structure; and
a third and fourth caster wheel attached to a bottom surface of the fixed platform in a vicinity of a fourth edge of the fixed platform, the fourth edge being opposite to the first edge.

5. The apparatus of claim 4 further comprising a handle mounted to the fixed platform in the vicinity of the fourth edge.

6. The apparatus of claim 4 further comprising a floor locker attached to the bottom surface of the fixed platform in the vicinity of the fourth edge, the floor locker having a footer either raised above a floor or lowered to the floor.

7. The apparatus of claim 6 further comprising a spring coupled between the floor locker and the fixed platform for urging the footer to be raised above the floor.

8. The apparatus of claim 1, wherein the support rod has a first end pivotally attached to the foldable platform and a second end releasably engaging the support structure.

9. The apparatus of claim 8, wherein the second end of the support rod has a L-shaped structure with each leg of the L forced against a side of the support structure when the foldable platform is held at the upright position.

10. The apparatus of claim 8, wherein the support rod rests on the support structure when the foldable platform is at the horizontal position.

11. The apparatus of claim 8 further comprising a spring coupled between the foldable platform and the support rod urging the support rod away from the foldable platform.

12. The apparatus of claim 1, wherein the support rod includes a gas cylinder and a cylinder rod slidable along the gas cylinder.

13. The apparatus of claim 12, wherein the gas cylinder is lockable with the cylinder rod.

14. The apparatus of claim 1, wherein the support structure provides support to the foldable platform in a vicinity of the second edge when the foldable platform is at the horizontal position.

15. The apparatus of claim 1, wherein the support structure includes two support beams mounted to the fixed platform and a crossbar mounted between the two support beams.

16. The apparatus of claim 1, wherein a the foldable platform has a first and second holes thereon for inserting a guide; and the fixed platform has a third and fourth holes thereon for inserting the guide, wherein diameters of the first, second, third and fourth holes are the same and a distance between the first and second holes equals to a distance between the third and fourth holes.

17. The apparatus of claim 1, wherein the predetermined angle is 90 degrees.

18. The apparatus of claim 1 further comprising a stopper for preventing the foldable platform from pivoting past the upright position.

19. An apparatus for transporting cargos, the apparatus comprising:
a fixed platform having a first edge and a first top surface for carrying the cargos;
a foldable platform having a second top surface for carrying the cargos and a second edge pivotally attached to the first edge, the foldable platform pivoting between a horizontal position and an upright position, the first and second top surface being in a same plane when the foldable platform being at the horizontal position, and the first and second top surface forming a predetermined angle when the foldable platform being at the upright position;
two support beams mounted to the fixed platform and extended to beneath the foldable platform;
a crossbar mounted between the two support beams; and
a support rod having an opposing first and second end, the first end pivotally attached to a bottom surface of the foldable platform and the second end releasably engaging the crossbar, when the second end being engaged with the crossbar, the support rod, a part of the support beams, a part of the fixed platform and a part of the foldable platform forming a triangle holding the foldable platform at the upright position.

20. A method for transporting cargos and storing a cart, the method comprising:
providing a fixed platform to the cart, the fixed platform having a first edge and a first top surface for carrying the cargos;
providing a foldable platform to the cart, the foldable platform having a second top surface for carrying the cargos and a second edge pivotally attached to the first edge;
pivoting the foldable platform between a horizontal position and an upright position, the first and second top surface being in a same plane when the foldable platform being at the horizontal position, and the first and second top surface forming a predetermined angle when the foldable platform being at the upright position;
providing a support structure extended from the fixed platform to beneath the foldable platform, and
pivoting a support rod between a first and second angle to the foldable platform, the second angle being different from the first angle, when at the second angle, the support rod, a part of the support structure, a part of the fixed platform and a part of the foldable platform forming a triangle holding the foldable platform at the upright position.

* * * * *